J. WEED.
Tree and Plant Protector.
No. 40,873.
Patented Dec. 8, 1863.
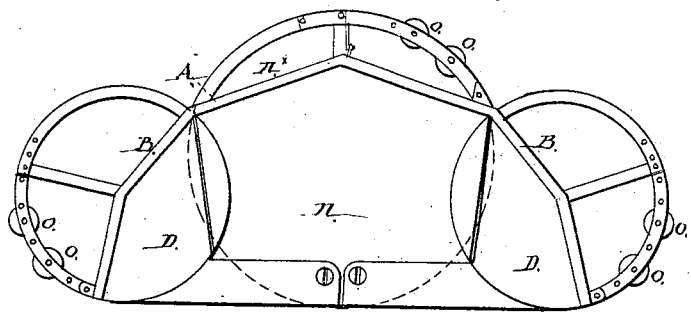
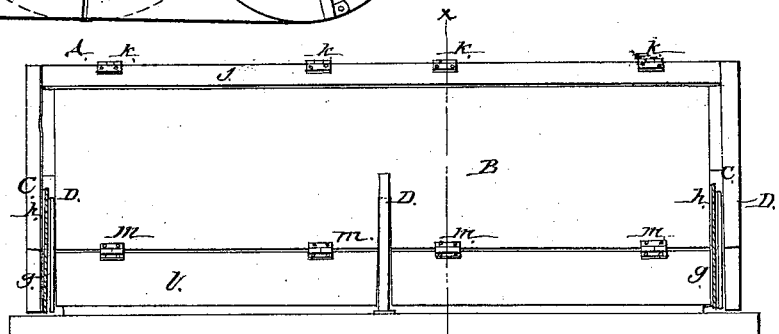
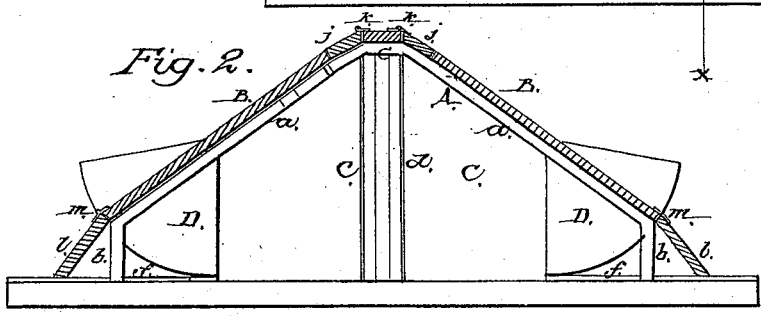
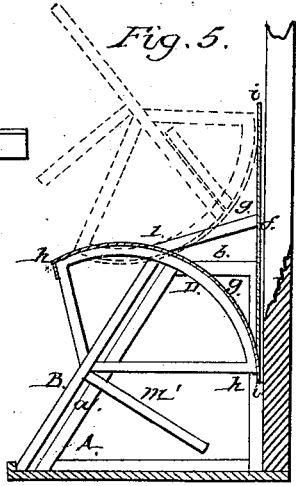
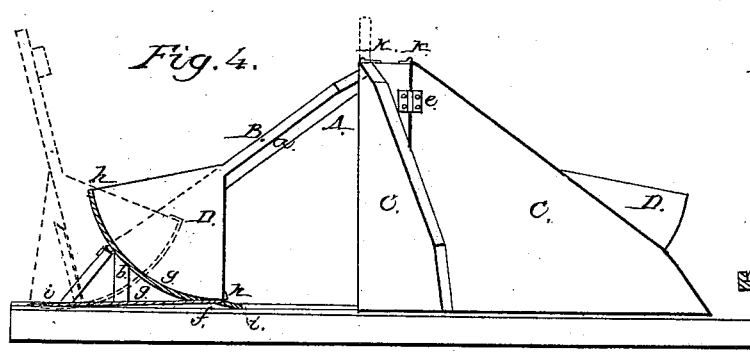
Witnesses:
J. W. Coombs
G. W. Reed
Inventor:
James Weed
per Munn & Co.
attorney

UNITED STATES PATENT OFFICE.

JAMES WEED, OF MUSCATINE, IOWA.

IMPROVEMENT IN PLANT-PROTECTORS.

Specification forming part of Letters Patent No. 40,873, dated December 8, 1863.

*To all whom it may concern:*

Be it known that I, JAMES WEED, of Muscatine, in the county of Muscatine and State of Iowa, have invented a new and useful Improvement in Tree and Plant Protectors; and I do hereby declare that the following is a full, clear, and exact description of the same, reference being had to the accompanying drawings, making a part of this specification, in which—

Figure 1 is a side view of a protector constructed according to my invention; Fig. 2, a transverse vertical section of a modification of the same, taken in the line *x x*, Fig. 3; Fig. 3, a front or back elevation of Fig. 2; Fig. 4, a side elevation of Figs. 2 and 3; Fig. 5, a transverse vertical section of a modification of the structure shown in Figs. 2, 3, and 4.

Similar letters of reference indicate corresponding parts in the several figures.

This invention relates to an improved means for protecting trees, vines, and other plants against injury from winter or spring frosts, and may be considered as the further carrying out, perfecting, or extending of a means which was patented by me October 21, 1862.

This invention consists in a novel way of arranging the shutters of the protector, whereby the former may be very readily manipulated or adjusted on or off from the structure or framing which covers the trees or plants to be protected.

In cold climates and for tender trees and plants thick and substantial shutters are required, which are necessarily heavy, and, if arranged in the ordinary way, difficult to move from the winter to the summer position, and vice versa, and the greater the inclination of the shutters to the base of the structure the greater the difficulty in moving or adjusting the former. To obviate this difficulty I have devised a rocker or rolling hinge or joint applied to the shutters in the manner substantially as hereinafter fully shown and described, whereby the desired end is fully attained.

To enable those skilled in the art to fully understand and construct my invention, I will proceed to describe it.

A, Fig. 2, represents a framing or structure which has inclined sides formed of parallel bars or slats *a*, upon which the shutters B rest when the framing is designed to be inclosed. The lower ends of the slats *a* may not extend down to the earth, but rest upon uprights *b*. This framing may be of any suitable length, as occasion may require, and it is provided with a ridge-pole, *c*, the ends of which are attached to uprights *d d*, the latter having shutters C C attached to them by hinges *e*, to admit of the ends of the structure or framing being open or exposed or covered and protected by said shutters, as desired. The ends of the framing or structure A being vertical, it will be seen that the shutters C may be hung upon hinges in the usual way and opened and closed without difficulty. The shutters B B, however, in being opened and closed, require to be lifted and let down bodily, and therefore cannot be manipulated in the usual way without a great deal of labor and difficulty, which is obviated as follows:

To each end of each shutter B B, and centrally between the ends thereof, and at other points if necessary or desired, I attach rockers D. These rockers may be in the form of quadrants, and their radii equal to about one-half the width of the shutter, so that the center of gravity of the former will be coincident with the inner ends of the radii of the rockers, and the shutters consequently be in a balanced state. These rockers work on ways *f* to prevent the lateral movement of the former, and the rockers are prevented from slipping on the ways longitudinally by means of cords *g*, two being attached at one end to each rocker at opposite ends thereof, as shown at *h*, and the opposite ends of the cords attached to the way, as shown at *i* in Fig. 4. By this arrangement it will be seen that the shutters B may be easily adjusted when on or off from the inclined slats *a* of the framing or structure A, the rockers D working or rolling on the ways *f*. In Fig. 4 an outward position of a shutter, B, is shown in red.

I would remark that the upper parts of the slats *a* are provided at each side of the ridge-pole *c* with narrow shutters *j*, the latter being attached by hinges *k* to the former. These shutters, when raised, serve as ventilators when the shutters B are closed, and they also serve as supplemental shutters for the structure. Supplemental shutters *t* are also attached by hinges m to the lower ends of the shutters B, to inclose the uprights b of the framing. These shutters t may be raised when the shutters B are closed. (See Figs. 2 and 3.)

In the above arrangement, where the inner ends of the radii of the rockers, extend to the centers of the width of the rockers it will be seen that the rockers carry the centers of the shutters forward and backward in a plane parallel with the base of the framing or structure A, the lower end of the shutters being elevated just as much as the top end is depressed in its motion either way from a vertical position. In case, however, a greater elevation of the shutter is required in order to suit a given pitch of the slats a, I have the radial centers of the rockers at one side of the center of gravity of the shutters, as shown in Fig. 5. By this arrangement the shutter will be elevated or thrown up as it is moved toward the framing or structure. In this modification the rockers, in consequence of their eccentric position relatively with the shutter, will involve a greater expenditure of power in being moved. This, however, may be compensated for by having arms $m'$ attached at right angles to the inner sides of the shutters, near their ends, and said arms may be loaded or weighted, if necessary, in order to balance the shutters.

Fig. 1 shows a modification of the invention designed for a portable protector. The rockers in this case are entire circle, extending around both the inner and outer sides of the shutters, so that the latter may be rolled from place to place with the greatest facility; and the framing or structure A may also have circular ends n, to admit of its ready removal in the same way, a roofing, $n^x$, being attached to the ends. These rockers and ends n, however, are not used for rolling the device a great distance, but merely to admit of the parts being turned so as to bring small rollers a in the rockers and ends in contact with the earth, the parts being shoved along on said rollers. This portable protector is applicable to isolated trees or plants and small structures or greenhouses.

It will be seen from the above description that the rockers may be arranged and applied in various ways, so as to suit all cases where trees, vines, or plants of any kind require protection, either under glass or by a framing and shutters alone.

Having thus described my invention, what I claim as new, and desire to secure by Letters Patent, is—

1. The employment or use of rockers D, of circular or sector form, attached to shutters B, to admit of the adjustment or manipulation thereof, substantially in the manner as and for the purpose herein set forth.

2. The supplemental shutters $j\ l$, attached respectively to the framing or structure and shutters, substantially as and for the purpose set forth.

3. Connecting the rockers with the base of the structure or with ways attached thereto by means of cords, as and for the purpose specified.

JAMES WEED.

Witnesses:
WM. LEFFINGWELL,
S. D. VIELE.